No. 628,599. Patented July 11, 1899.
J. F. DOOLITTLE.
STEAM HAMMER.
(Application filed July 5, 1898.)
(No Model.) 3 Sheets—Sheet 1.
Fig. I.
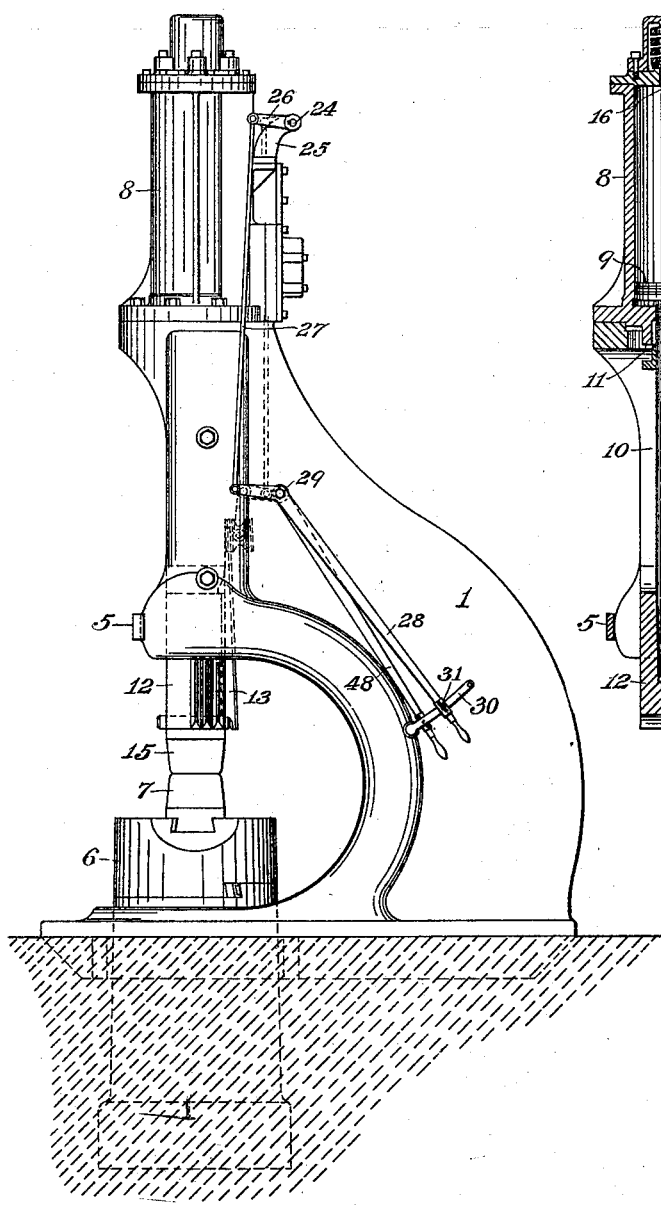
Fig. II.
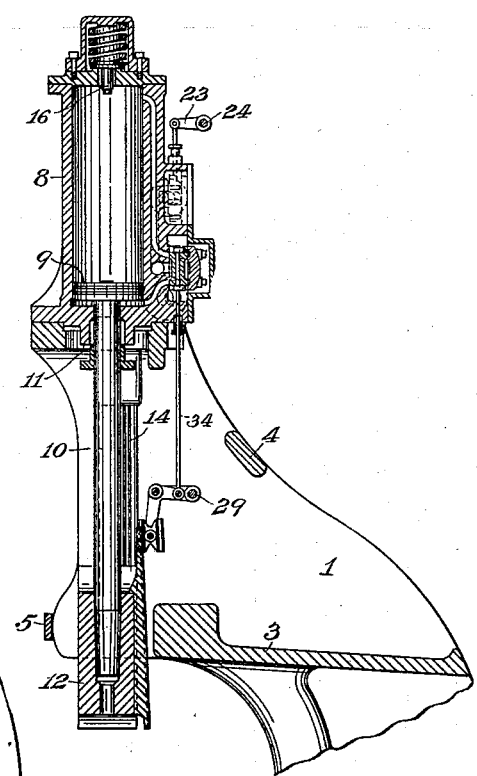
WITNESSES:
A. W. Turner
G. H. Wolcott
INVENTOR,
John F. Doolittle
BY
Luther G. Hopper
ATTORNEY.
THE NORRIS PETERS CO., PHOTO-LITHO., WASHINGTON, D. C.

No. 628,599. Patented July 11, 1899.
J. F. DOOLITTLE.
STEAM HAMMER.
(Application filed July 5, 1898.)
(No Model.) 3 Sheets—Sheet 2.
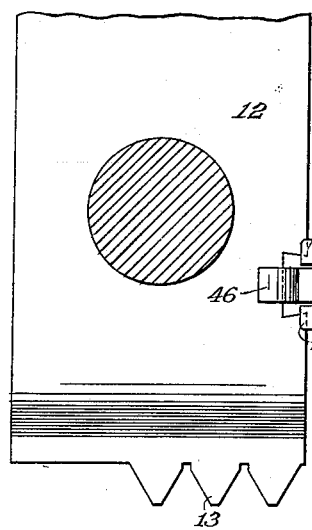
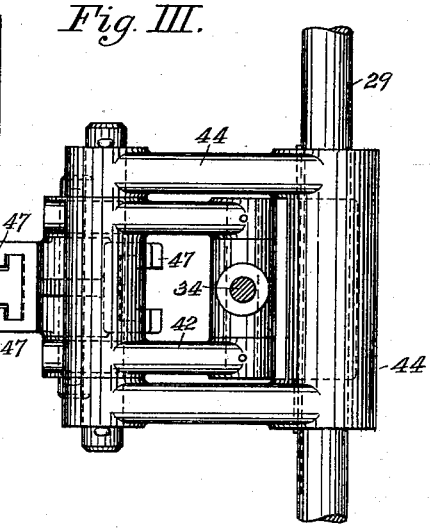
Fig. III.
Fig. V.
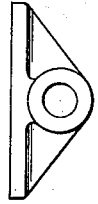
Fig. VI.
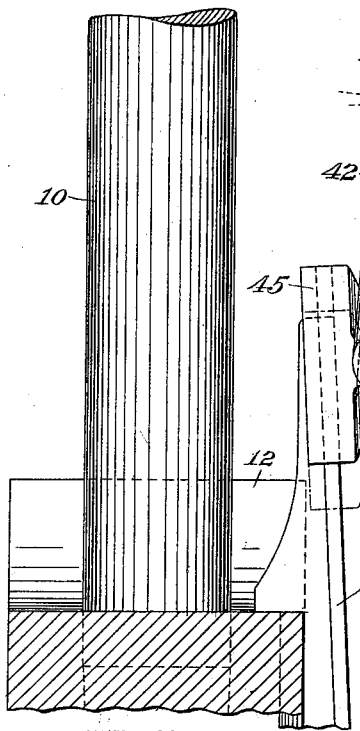
Fig. IV.
WITNESSES:
A. W. Turner
G. H. Wolcott
INVENTOR,
John F. Doolittle.
BY
Luther G. Hopper,
ATTORNEY.

No. 628,599. Patented July 11, 1899.
J. F. DOOLITTLE.
STEAM HAMMER.
(Application filed July 5, 1898.)
(No Model.) 3 Sheets—Sheet 3.
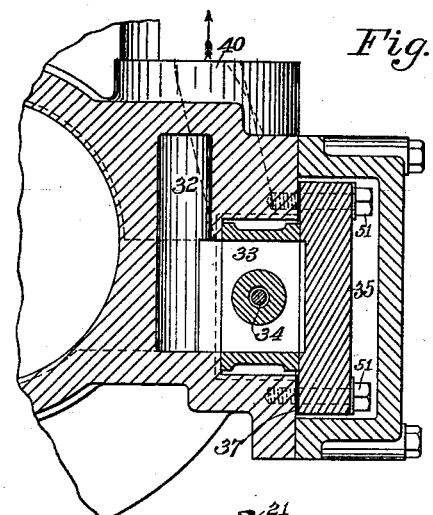
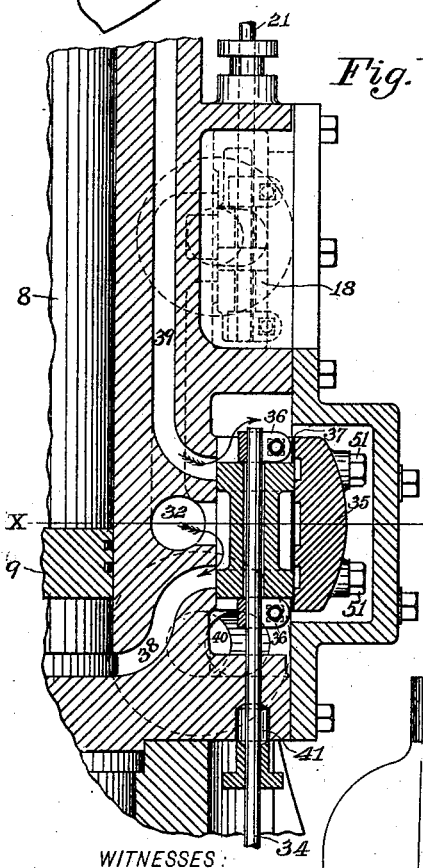
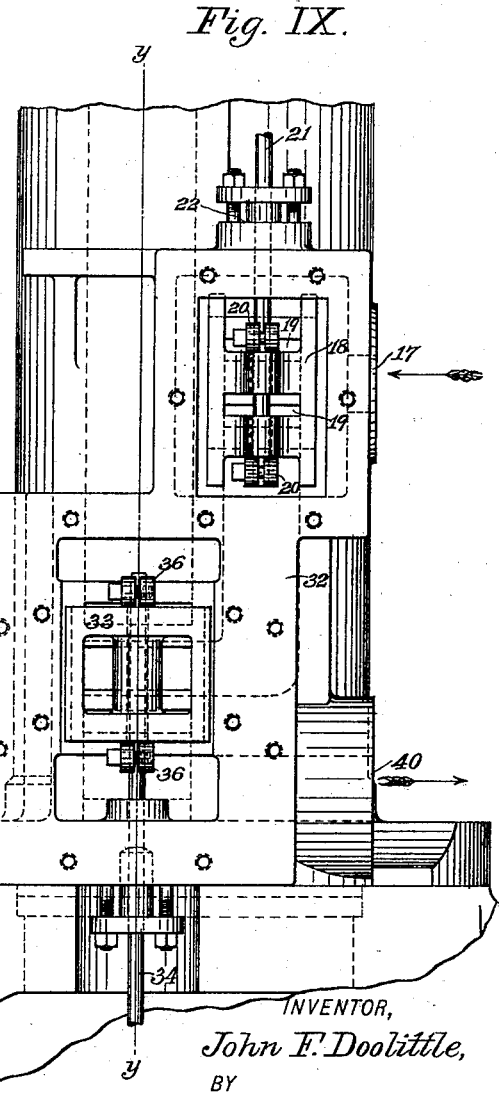
WITNESSES:
A. W. Turner
G. H. Wolcott
INVENTOR,
John F. Doolittle,
BY
Luther G. Hopper,
ATTORNEY.

UNITED STATES PATENT OFFICE.

JOHN F. DOOLITTLE, OF CLEVELAND, OHIO.

STEAM-HAMMER.

SPECIFICATION forming part of Letters Patent No. 628,599, dated July 11, 1899.

Application filed July 5, 1898. Serial No. 685,159. (No model.)

*To all whom it may concern:*

Be it known that I, JOHN F. DOOLITTLE, a citizen of the United States of America, and a resident of Cleveland, in the county of Cuyahoga and State of Ohio, have invented certain new and useful Improvements in Steam-Hammers, of which the following is a specification.

My invention relates to improvements in the valve-gear of steam-hammers; and it is obvious that the principle of this invention is also adapted to such other machines or engines as have an analogous duty to perform.

The object of my improvement is to provide a valve-gear which is positive in its operation by means of the central plane of motion of all its parts coinciding with a plane passing through the center line of the valve-rod, thereby avoiding all side strains and springing due to overhanging parts, and which is so arranged that the sliding surfaces may be of ample area to reduce to a minimum the wearing of the surfaces and the friction arising therefrom.

Further objects are accessibility for the purpose of lubrication, adjustment, or repair and the comparatively small cost of manufacture.

I attain these objects by the mechanism illustrated in the accompanying drawings, in which—

Figure I is a side elevation of my improved steam-hammer. Fig. II is a vertical section of the same with the lower part broken away. Fig. III is a plan view of the valve-operating mechanism. Fig. IV is a side elevation of the same. Figs. V and VI represent a plan and elevation, respectively, of an alternative form of slipper. Fig. VII is a sectional plan view on line X X of Fig. VIII. Fig. VIII is a vertical section of the steam-chest, valve, and a portion of the cylinder, taken on line $y\ y$ of Fig. IX. Fig. IX is a rear elevation of the cylinder, valves, and upper part of frame with the steam-chest and valve-covers removed.

The frame 1 of the hammer, as illustrated, consists of two vertical webs standing side by side and connected together at the top and at the base and by suitable intermediate cross-pieces, as 3, 4, and 5. The anvil-block 6 rests either upon the base of the frame or extends through it, as shown, and has keyed to its upper face a die 7. A steam-cylinder 8 is secured to the top of the frame and has a piston 9 fitted to reciprocate within it. The piston-rod 10, which is either integral with or secured to the piston, slides through a suitable stuffing-box 11 in the lower cylinder-head and carries the tup or ram 12, securely fastened to its lower end. The ram is provided with V-shaped guides 13 upon its sides, which slide in corresponding guides 14 upon the frame. A die 15 is keyed to the lower face of the ram and works against the lower die 7 upon the anvil-block. In the upper cylinder-head is a spring-buffer 16, for the purpose of cushioning any blow which the piston might by chance in its upward stroke deliver against the head.

Steam enters the throttle-valve chamber at 17, Fig. IX. A slide-valve 18 is fitted to slide over the live-steam inlet-ports 19, opening or closing them, as desired. This throttle-valve is secured by suitable clamps 20 to the lower end of the rod 21, which slides through a stuffing-box 22 and is connected at its upper end by a suitable joint to swinging end of the arm 23, Fig. II, which arm is rigidly secured to the shaft 24. This shaft is journaled in the bearing 25 and has keyed to its outer end the arm 26, the swinging end of which is connected by the rod 27 to the upper end of the hand-lever 28. A rock-shaft 29 is journaled in suitable bearings in each vertical web of the frame, on the extension of which, outside of the frame, the hand-lever 28 is loosely fulcrumed. The lever 28 is provided with a slot near its lower end to engage a segment 30, which is fastened to the frame. A thumb-screw 31 is used to clamp the lever in any desired position. It will readily be seen that by raising the hand-lever the throttle-valve is depressed, the ports 19 are opened, and steam is admitted to the live-steam passage 32, Fig. VIII. In smaller sizes the hand-lever 28 is keyed directly to the shaft 24, thus avoiding the interposition of the connecting-rod 27.

A slide-valve 33 (in shape an approximately rectangular frame with a nave to receive the valve-rod 34) is fitted with steam-tight joints between its seat and a valve-cover 35. Suitable clamps 36 are provided to hold the valve in position on the valve-rod by which it is supported and reciprocated vertically. The valve-cover is rigidly secured to the valve-chest by the bolts 51 and has recesses on its inner face directly opposite and corresponding in area to the steam-ports, by means of which the steam-pressure is equalized on each side of the valve. Between the valve-cover and the face of the steam-chest I prefer to interpose liners 37, of thin metal, paper, or other suitable material, so that by varying the number of which the cover may be at any time adjusted. Steam enters the interior of the valve through the middle port from the live-steam passage 32. When the valve is depressed, the lower port is opened and the steam is admitted through the passage 38 to the lower end of the cylinder, forcing the piston upward, and the exhaust-steam passes out through the upper passage 39 into the valve-chest, from whence it escapes through the outlet 40, as indicated by the arrows. When the valve is raised, steam enters the upper passage, forcing the piston down, and the exhaust-steam escapes through the lower passage to the valve-chest.

The valve-rod 34 extends downward through a stuffing-box 41 and is hinged centrally between the horizontal arms of the double bell-crank 42, Figs. III and IV. The bell-crank 42 is fulcrumed at 43 between the swinging arms of the double lever 44, which is keyed to the rock-shaft 29. Hinged centrally between the vertical arms of the bell-crank 42 is a double-faced slipper 45, which is fitted to slide upon the inclined guide 46, which incline is fixedly secured to the ram. I prefer to make this slipper with overlapping flanges 47, as shown in Figs. III and IV, as it insures the valve coming down with the downstroke of the ram; but in hammers for some kinds of service it may be desired to allow the valve to drop by gravity, in which case I construct the slipper without flanges. (Shown in Figs. V and VI.) I also prefer a double-faced slipper, as it is more nearly balanced, and when one side becomes worn the other side may be placed in contact with the incline; but a single-faced slipper may be used without violating the principle of my invention.

The compensating hand-lever 48 (see Fig. I) is keyed firmly to the rock-shaft 29 just outside of its bearing in the frame and has a segment near its lower end, which segment is similar and parallel with the one described for hand-lever 28.

In operating the hammer steam is admitted through the throttle by means of lever 28 and its connections, which being held stationary and lever 48 being held in its lower position, as shown, the ram will rise until the incline has moved the center of the slipper to a point indicated by the small circle 49, Fig. IV, when the center of the valve-rod pivot will have moved up to a point 50, thus raising the valve and admitting steam above the piston, when the piston will descend and continue reciprocating in the lower section of the cylinder.

By raising the hand-lever 48 to the position shown by the broken dotted lines, Fig. IV, the other parts will take a position denoted by similar outlines, in which event the piston will reciprocate in the upper section of the cylinder. It will be observed that the length of stroke under the foregoing conditions is determined by the lap of the valve; but by opening the throttle wider the stroke becomes longer, and so in order to strike a hard blow the operator may open the throttle wide. By opening the throttle wide and then manipulating the compensating hand-lever so as to throw the valve to its highest position when the ram is near its extreme upper position an exceptionally hard blow may be struck. Through proper handling of the levers blows of any desired force may be struck.

Various modifications can be made in the details of my invention without departing from the principles thereof, since, Having described one mode of applying it, what I claim as new, and desire to secure by Letters Patent, is—

1. In a steam-hammer, the combination of a slide-block arranged to slide upon an inclined guide attached to the rear face of the ram, a forked or double-armed elbow-lever having the slide-block hinged between its depending arms and the valve-rod hinged between its other arms, an operating-shaft journaled in the frame and carrying a forked or double arm embracing and hinged to the fulcrum of the elbow-lever, and a distributing-valve connected by means of a valve-rod to the elbow-lever, substantially as set forth.

2. In a steam-hammer, the combination consisting of the following elements, the center lines and central planes of motion of which all lie in the same plane; a slipper sliding upon an incline attached to the ram, a forked or double-armed bell-crank having the slipper hinged between its depending arms and the valve-rod hinged between its other arms, an operating-shaft journaled in the frame and having attached to it a forked or double arm embracing and hinged to the fulcrum of the bell-crank, a valve-rod connecting the bell-crank to the valve, and a sliding valve inclosed in a valve-chest which distributes steam to and from the cylinder, substantially as set forth.

In testimony whereof I affix my signature, in the presence of two witnesses, at Cleveland, Ohio, June 18, 1898.

JOHN F. DOOLITTLE.

Witnesses:
GEORGE B. RILEY,
GEO. H. WOLCOTT.